United States Patent
Morper

(10) Patent No.: US 11,368,397 B2
(45) Date of Patent: Jun. 21, 2022

(54) SWAPPING HEADER INFORMATION FOR DATA TRANSMISSION

(71) Applicant: NOKIA TECHNOLOGIES OY, Espoo (FI)

(72) Inventor: Hans-Jochen Morper, Erdweg (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/421,208

(22) PCT Filed: Jan. 15, 2019

(86) PCT No.: PCT/EP2019/050847
§ 371 (c)(1),
(2) Date: Jul. 7, 2021

(87) PCT Pub. No.: WO2020/147923
PCT Pub. Date: Jul. 23, 2020

(65) Prior Publication Data
US 2022/0045949 A1 Feb. 10, 2022

(51) Int. Cl.
*H04L 45/745* (2022.01)
*H04L 45/00* (2022.01)

(52) U.S. Cl.
CPC ............ *H04L 45/745* (2013.01); *H04L 45/38* (2013.01)

(58) Field of Classification Search
CPC .............................. H04L 45/745; H04L 45/38
See application file for complete search history.

(56) References Cited

U.S. PATENT DOCUMENTS

| 2015/0271137 | A1 | 9/2015 | Seok |
| 2016/0036703 | A1* | 2/2016 | Josyula ................... H04L 45/66 370/392 |
| 2017/0171068 | A1 | 6/2017 | Morper et al. |
| 2017/0195288 | A1* | 7/2017 | Libby ................... H04W 76/12 |
| 2018/0159758 | A1 | 6/2018 | Waizel |

(Continued)

FOREIGN PATENT DOCUMENTS

| CN | 1968184 A | 5/2007 |
| CN | 104796849 A | 7/2015 |
| CN | 107404546 A | 11/2017 |

(Continued)

OTHER PUBLICATIONS

International Search Report and Written Opinion dated Aug. 22, 2019 corresponding to International Patent Application No. PCT/EP2019/050847.

(Continued)

*Primary Examiner* — Donald L Mills
(74) *Attorney, Agent, or Firm* — Squire Patton Boggs (US) LLP

(57) ABSTRACT

The present subject matter relates to a method comprising receiving at a first gateway a data packet from a first host in destination to a second host. A first portion of a header information of the data packet may be replaced by the first gateway by information comprising an identity information of at least one of the first host and the second host. The data packet may be transmitted by the first gateway in accordance with a second portion of the header information to a second gateway serving the second host.

14 Claims, 7 Drawing Sheets

(56) References Cited

U.S. PATENT DOCUMENTS

2019/0068544 A1\* 2/2019 Hao ........................ H04L 45/26
2020/0344207 A1\* 10/2020 Augustyn ........... G06F 16/2379

FOREIGN PATENT DOCUMENTS

| CN | 108293022 A   | 7/2018  |
|----|---------------|---------|
| EP | 1 445 919 A2  | 8/2004  |
| JP | 2006-166315 A | 6/2006  |
| JP | 2015-534796 A | 12/2015 |

OTHER PUBLICATIONS

Notification of Transmittal of the International Preliminary Report on Patentability & IPRP dated Apr. 21, 2021 corresponding to International Patent Application No. PCT/EP2019/050847.

Notice to file a Response ("preliminary rejection") dated Aug. 24, 2021 corresponding to Korean Patent Application No. 10-2021-7025354, with brief English Summary thereof.

Notification of the First Office Action dated Dec. 3, 2021 corresponding to Chinese Patent Application No. 2019800890856, with English Summary thereof.

Notice of Reasons for Rejection dated Feb. 8, 2022 corresponding to Japanese Patent Application No. 2021-540870, with English summary thereof.

\* cited by examiner

| | host | MAC-address | Identity information |
|---|---|---|---|
| H1-set → | H1 | 1F:3E:55:27:22:1A | 00:00:00 | 201
| H1-set → | H2 | 37:24:EE:1F:2E:D4 | 00:00:01 | 203
103 101    206    205
Fig. 2
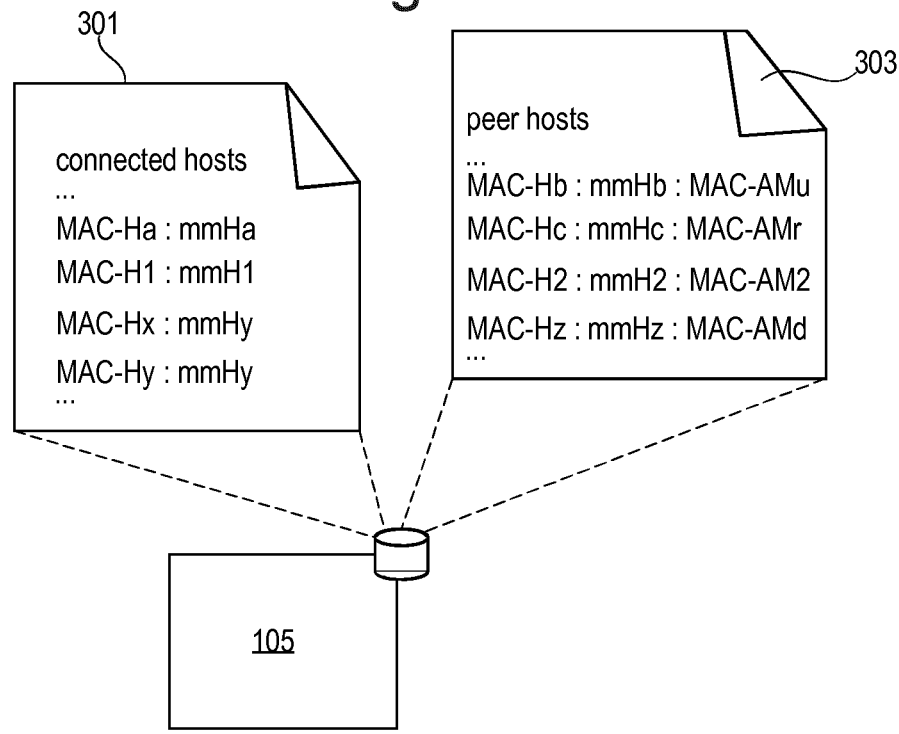
Fig. 3A
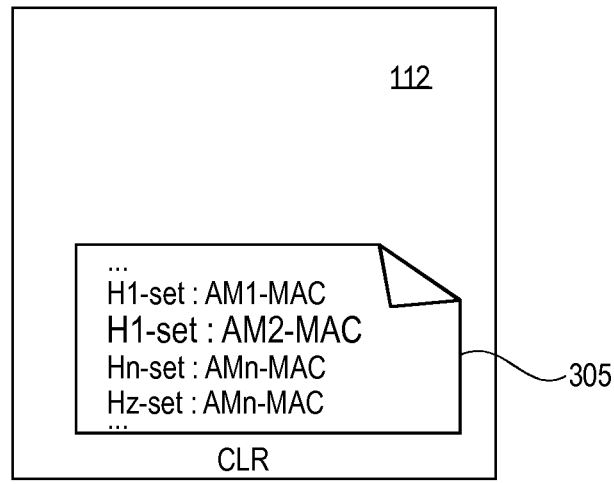
Fig. 3B

SWAPPING HEADER INFORMATION FOR DATA TRANSMISSION

TECHNICAL FIELD

Various example embodiments relate to computer networking, and more particularly to a method for swapping header information for data transmission.

BACKGROUND

Networks such as Local Area Networks (LAN) make a significant impact on almost every industry. To meet their growing needs, these industries make use of several networks e.g. each devoted to a different department. However, there is a need for improving data transmission in such networks.

SUMMARY

Example embodiments provide a method comprising: receiving at a first gateway a data packet from a first host in destination to a second host, replacing by the first gateway a first portion of a header information of the data packet by information comprising an identity information of at least one of the first host and the second host, transmitting by the first gateway the data packet in accordance with a second portion of the header information to a second gateway serving the second host According to further example embodiments, a method comprises receiving at a gateway a data packet in destination to a second host served by the gateway, the data packet comprising an identity information of the second host, using the identity information of the second host for determining a network address of the second host, replacing a network destination address of the received data packet by the determined network address, transmitting the data packet to the second host.

According to further example embodiments, a method comprises receiving from a gateway at a database system a request of identity information of a host served by the gateway, the request being indicative of a network address of the host, searching the received network address in a data container comprising network addresses and associated identity information, in response to identifying the received network address in the data container, returning an identity information associated with the identified network address, otherwise generating an identity information, and returning the generated identity information.

According to further example embodiments, an apparatus comprises: means configured to receive a data packet from a first host in destination to a second host, means configured to replace a first portion of the header information of the data packet by information comprising an identity information of at least one of the first host and the second host, means configured to transmit the data packet in accordance with a second portion of the header information to a second gateway serving the second host.

According to further example embodiments, an apparatus comprises: means configured to receive a data packet in destination to a second host, the data packet comprising an identity information of the second host; means configured to use the identity information of the second host for determining a network address of the second host, means configured to replace a network destination address of the received data packet by the determined network address; means configured to transmit the data packet to the second host.

According to further example embodiments, an apparatus comprises means configured to receive from a gateway a request of identity information of a host served by the gateway, the request being of a network address of the host, means configured to search the received network address in a data container comprising layer addresses and associated identity information, means configured to in response to identifying the received network address in the data container, returning an identity information associated with the identified network address, otherwise generating an identity information, and returning the generated identity information.

According to further example embodiments, a computer program comprises instructions stored thereon for performing at least the following: receiving a data packet from a first host in destination to a second host, replacing a first portion of the a header information of the data packet by information comprising an identity information of at least one of the first host and the second host, transmitting the data packet in accordance with a second portion of the header information to a second gateway serving the second host.

According to further example embodiments, a computer program comprises instructions stored thereon for performing at least the following: receiving a data packet in destination to a second host served by the gateway, the data packet comprising an identity information of the second host; using the identity information of the second host for determining a network address of the second host; replacing a network destination address of the received data packet by the determined network address; transmitting the data packet to the second host.

According to further example embodiments, a computer program comprises instructions stored thereon for performing at least the following: receiving from a gateway a request of identity information of a host served by the gateway, the request being indicative of a network address of the host, searching the received network address in a data container comprising network addresses and associated identity information, in response to identifying the received network address in the data container, returning an identity information associated with the identified network address, otherwise generating an identity information, and returning the generated identity information.

BRIEF DESCRIPTION OF THE DRAWINGS

Some example embodiments will now be described with reference to the accompanying drawings. In the figures:

FIG. 2 illustrates a method for generating identity information of hosts according to an example of the present subject matter;

FIG. 3A is a diagram illustrating an example for storing mapping information according to an example of the present subject matter;

FIG. 3B is a diagram illustrating an example for storing mapping information in a database system according to an example of the present subject matter;

DETAILED DESCRIPTION

Figure 1:
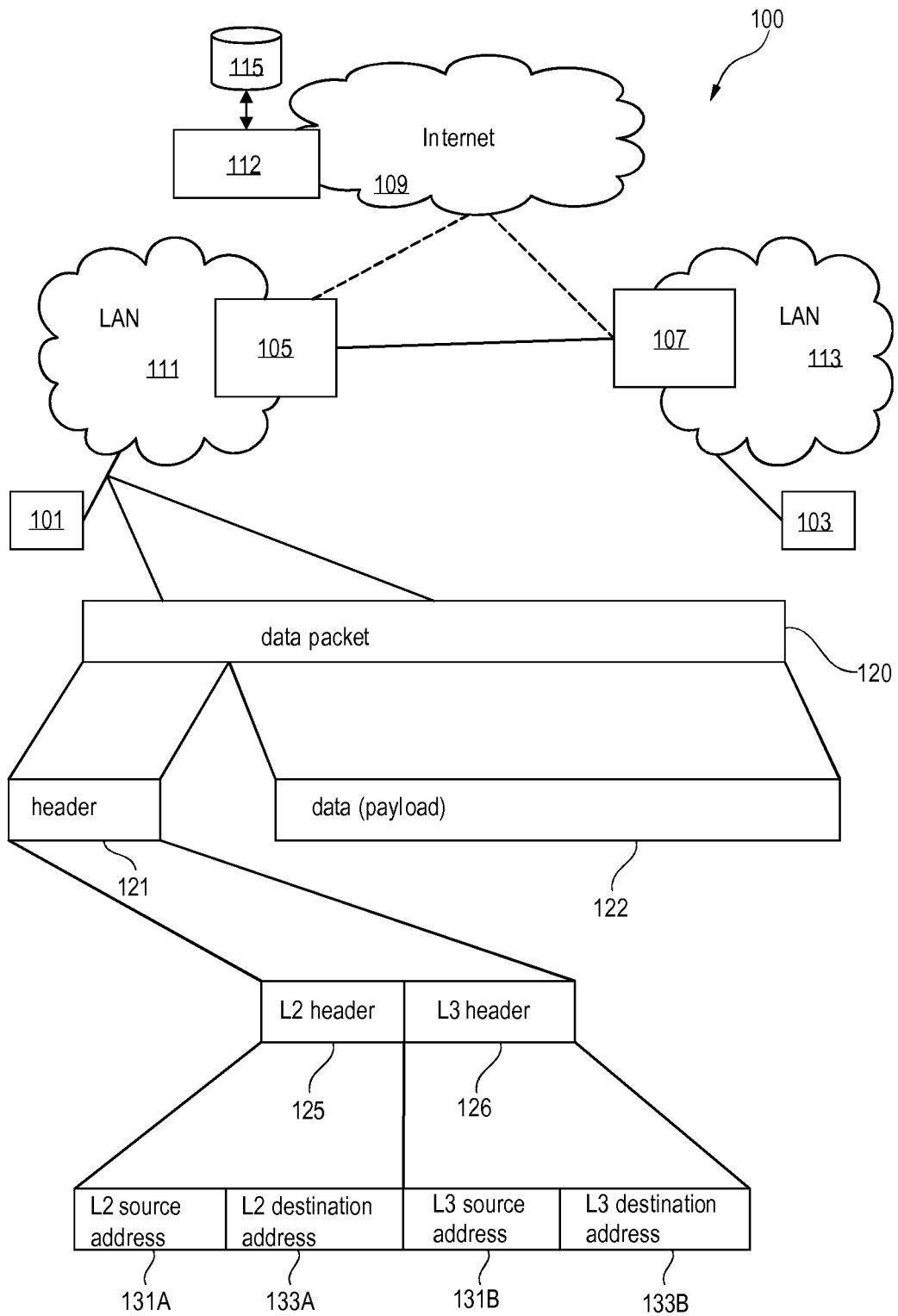
FIG. 1 is a block diagram of a system for data exchange between multiple hosts.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The present subject matter may enable a transport-based mobility for devices that communicate with other devices using a layered communication protocol such as a layer 2, layer 3 or higher layer protocol. For example, with the present subject matter, the same host may move between different LANs and get served by respective gateways in a transparent manner.

The present subject matter may seamlessly be integrated in exiting systems. For example, the present subject matter may be implemented in gateways realized on software-defined networking (SDN) nodes. As the SDN nodes may be used to make modifications on packet headers, the present subject matter may allow integration into existing layer 2 networks for support of layer 2 devices without or with minimal re-configuration or modification at nodes because modifications are solely done at the header portion of received packets without changing the length of individual packets. Since the packet length of the received and modified data packet does not vary, this may prevent a complex re-configuration of a network since packet lengths are usually fixed and constant.

According to an example, the information further comprises user defined information. This may increase the amount of data that can be transmitted in a network employing the present subject matter with minimal configuration of the network. The user defined information may, for example, comprise values of configuration or performance parameters. An example of the performance parameter may be a quality of service parameter such as latency, jitter and bandwidth of the first host or of the first gateway. An example of the configuration parameter may be an energy consumption parameter.

According to an example, the method further comprises determining the identity information of the first and second hosts using the first portion of the header information.

The identity information of each of the first and second hosts may be generated such that it uniquely identifies the first and second hosts respectively. The identity information of the first and second hosts may be generated while the first and second hosts are served by the first and second gateways respectively. The identity information may be determined using the size of the first portion of the header information. The size of the identity information of the first and second hosts may be smaller than or equal to the size of the first portion of the header information. The identity information of a host may, for example, be an identifier.

The identity information of the first host in association with at least part of the first portion of the header information may be accessible (e.g. shared) by the first and second gateways. The identity information of the second host in association with at least part of the second portion of the header information may be accessible (e.g. shared) by the first and second gateways. The at least part of the first portion of the header information may comprise a network address of the first host. The at least part of the second portion of the header information may comprise a network address of the second host. The network address as described herein may, for example, be a layer 2 address or a layer 3 address.

For example, the first portion of the header information may comprise a source layer 2 address of the first host. In another example, the first portion of the header information may further comprise a source layer 3 address of the first host. The second portion of the header information of the received packet at the first gateway may, for example, comprise a network address of the second host. For example, upon receiving the data packet, the network destination address of the second portion of the data packet may be replaced by the network address of the second gateway, and the resulting data packet may be transmitted to the second gateway.

The network address of the second gateway may be obtained using mapping information of the first gateway or mapping information of the database system. The mapping information may indicate at least one of the identity information of the second host and the network address of the second host in association with the network address of the second gateway that serves the second host. In one example, the first gateway may search for the network address of the second gateway in the mapping information using the network address of the second host that is part of the received data packet.

In one example, upon receiving the data packet, the first gateway may query the database system with the network address of the second host for obtaining the network address of the second gateway that is associated with the network address of the second host and may receive the network address of the second gateway from the database system. The network address of the second gateway may, for example, be a layer 2 address or a layer 3 address. Sending or transmitting the data packet in accordance with the second portion of the header information comprises using the second portion for transmitting the data packet.

In another example, the identity information of the first and second hosts may be determined or generated autonomously by each gateway of the first and second gateways individually and based on a common predefined algorithm. In one example, the predefined algorithm may be configured to receive as input a network address such as a layer 2 address and may generate based on the received input an identifier. Furthermore, if the generated identifier is provided as input to the algorithm, the algorithm may be configured to reconstruct the network address from which the identifier is generated. For example, if the input network address is a MAC address, the Organizationally Unique Identifier (OUI) field (24 bits) may partially be re-used since just (host-) equipment from a selection of certified vendors may be used. E.g. instead of using the full 24 bits, a fraction (e.g. 4 bits) may be used to identify the vendor out of a list available in a given environment and available at each gateway.

In a further example, the identity information may be determined using an SDN-control protocol. Gateways may be composed of an SDN network element (SDN-NE) which is a data forwarding hardware platform for network (forwarding) nodes like switches or routers or gateways, and a control software resided outside the network, e.g. at a data center. The control software comprises an SDN controller and an application. The control software may allow to operate connected SDN-NEs either as pure forwarding node (e.g. switch or router) or as a gateway.

The control software may allow to change an operation mode of an SDN-NE dynamically during operation. When operating as a gateway, rules for identity information determination may be stored in a flow table. If a new host attaches to a gateway (SDN-NE), and the gateway does not have a rule for determining the identity information for the new host, the gateway may request a new rule for this new host to the gateway's application via the SDN controller using the SDN-control protocol between the SDN-NE and SDN controller e.g. OpenFlow. The assignment or determination of an identity information to the new host may be done by the application and may result in a new rule or in an update of an existing rule at the SDN-NE's flow table. By this, the determination of the identity information may be realized as forwarding rules, assigned centrally via an SDN-controller without requiring individual access to a data base by a gateway.

According to an example, the identity information of the first host is a value of a first grouping of bits and the identity information of the second host is a value of a second grouping of bits, wherein the first and second grouping of bits have different number of bits. The first portion of the header information is different from the second portion of the header information. The second portion of the header information of the data packet that is transmitted by the first gateway to the second gateway comprises a network address of the second gateway.

The first portion of the header information consists of a set of bits. The first grouping of bits may be a subset of bits of the set. The second grouping of bits may be a subset of bits of the set. The second grouping of bits may be distinct from the first grouping of bits. The first grouping of bits may be used for determining by the first gateway identity information of hosts, such as the first host, that are served by the first gateway. The second grouping of bits may be used for determining by the first gateway identity information of hosts, such as the second host, that are served by the second gateway.

This may result in an asymmetry of the determined identities and may thus enable a flexible and optimal usage of resources e.g. if a given gateway can serve more hosts than another gateway, the grouping of bits for hosts of the given gateway may have a number of bits higher that the number of bits in the grouping of bits for the other gateway. This example may further enable to dynamically change the number of bits to be used for the groupings of bits.

According to an example, the identity information of the first host is a value of a first grouping of bits and the identity information of the second host is a value of a second grouping of bits, wherein the first grouping of bits has a number of bits higher than the second grouping of bits.

According to an example, the identity information of the first host is a value of a first grouping of bits and the identity information of the second host is a value of a second grouping of bits, wherein the first and second grouping of bits have the same number of bits. Using the same type of identifiers may enable to define a single set of all possible unique values that can be used as identity information for both sending and receiving hosts. This may save processing resources that would otherwise be required for maintaining and processing different sets of the identity information.

According to an example, the identity information of the first host is a value of a first grouping of bits. The method further comprises determining the first grouping of bits such that the maximum number of possible values of the first grouping of bits is smaller than or equal to a predefined maximum number of hosts that can be served by the first gateway.

According to an example, the identity information of the second host is a value of a second grouping of bits. The method further comprises determining the second grouping of bits such that the maximum number of possible values of the second grouping of bits is smaller than or equal to a predefined maximum number of hosts that can be served by the second gateway.

These examples may enable an efficient control of the transport-based mobility for devices that are served by the first and second gateway.

According to an example, the method further comprises providing a local data container comprising network addresses and associated predefined identity information, and determining the identity information of the first host and/or second host using the local data container. The identity information of the first and/or second host may be determined using the respective network addresses that are encoded in the received data packet. The network address may comprise a layer 2 address. For example, each layer 2 address of the local data container may be associated with a respective identity information. The local data container may comprise an entry per host. The entry of a host may comprise mapping information of the host. The mapping information of the host may comprise a layer 2 address of the host in association with an identity information of the host. This example may speed up the data transmission process as the identity information is locally determined.

According to an example, the method further comprises upon receiving the data packet, querying a remote data container comprising network addresses and associated predefined identity information, with a network address of the first host and/or second host and receiving the identity information from a database system storing the remote data container. The network address of each of the first host and second host may be a layer 2 or layer 3 address. The network addresses in the remote data container may be layer 2 or layer 3 addressed. This example may enable a centralized and consistent control of the identity information for different gateways.

According to an example, the received data packet comprises a header from at least one of the layer 2 and layer 3 communication protocols. This may enable a seamless integration of the present method in existing systems.

According to an example, the transmitting comprises causing the second gateway to use the identity information of the first host and/or the second host for transmitting the data packet to the second host. In one example, the transmitting the data packet to the second host may be performed in accordance with a layer 2 communication protocol. The reception of the data packet from the first gateway may trigger the second gateway to transmit the data packet to the second host using the identity information. The second gateway may determine or identify the network address such as a layer 2 address of the second host using the identity information of the second host of the data packet received at the second gateway. The second gateway replaces the network destination address that is in the received data packet by the identified network address of the second host. For example, the second gateway may determine the layer 2 address of the first and/or second hosts using the respective identity information.

According to an example, the method further comprises: receiving from the database system a notification indicating that the first host is a removed host and upon receiving at the gateway another data packet from another first host in destination to another second host, the method may be repeated using the identity information of the first host as an identity information of the other first host. The first host may be removed from a system that comprises the first gateway. This may enable an efficient use or re-use of resources. In one example, the database system may be configured to assign the identity information of the first host as an identity information of the other first host if the first host is removed from the system.

FIG. 1 is a block diagram of a system 100 for data exchange between multiple hosts, such as first host 101 and second host 103. The hosts 101 and 103 communicate to one another through gateways, such as first gateway 105 and second gateway 107. The first gateway 105 may be a first hop bridge node (which may be denoted as access mediator (AM)).

The first host 101 couples to the first gateway 105 via a first local network, such as a first LAN 111. The second host 103 couples to the second gateway 107 via a second a second local network such as a second LAN 113. The first LAN and second LAN may, for example, be Ethernet networks.

The first host 101 may be configured to connect to the first LAN 111 either by wire or wirelessly via a Wireless LAN (WLAN) access point. The second host 103 may be configured to connect to the second LAN 113 either by wire or wirelessly via a WLAN access point. A host of the first and second hosts 101-103 may comprise, for example, a notebook with an application running on it, e.g. a web browser fetching content by use of a HTTP protocol, or a server running a web server to provide content by supporting the HTTP protocol.

The first host 101 may be configured to communicate in accordance with at least one of a layer 2 communication protocol and layer 3 communication protocol. The second host 101 may be configured to communicate in accordance with at least one of a layer 2 communication protocol and layer 3 communication protocol.

Each of the first and second gateways 105-107 may be configured to enable data to flow from network to another network. For example, the first gateway 105 may be configured to enable data flow or transmission from the first LAN 111 to the second LAN 113 e.g. in accordance with a tunneling communication protocol. The second gateway 105 may be configured to enable data flow or transmission from the second LAN 113 to the first LAN 111 e.g. in accordance with a tunneling communication protocol.

The first gateway 105 and the second gateway 107 may be configured to exchange data packets at a defined network layer such as a network layer 2 or network layer 3. The data packets conveyed between the gateways 105 and 107 may, in one example, be forwarded by network forwarding nodes of the internet such as routers and switches.

The first gateway 105 may be configured to communicate in accordance with at least one of a layer 2 communication protocol and layer 3 communication protocol. The second gateway 105 is configured to communicate in accordance with at least one of a layer 2 communication protocol and layer 3 communication protocol.

The layer 2 communication protocol may, for example, be an Ethernet protocol. The layer 3 communication protocol may, for example, be an internet protocol (IP). For example, the first host 101 may be configured to send a data packet 120 e.g. in destination the second host 103. The data packet 120 may comprise a header 121 and a payload 122. The header 120 may, for example, comprise fields, wherein each field comprises information indicative of the data packet. The header 121 may, for example, be a layer 2 header 125. In another example, as shown in FIG. 1, the header 121 may comprise a layer 2 (L2) header 125 and a layer 3 (L3) header 126. L2 header 125 may comprise fields 131A and 133A for enabling data communication in accordance with the layer 2 communication protocol. L3 header 126 may comprise fields 131B and 133B for enabling data communication in accordance with the layer 3 communication protocol. Fields 131A and 131B (collectively referred to as 131) may, for example, comprise a source layer 2 address and source layer 3 address respectively. Fields 133A and 133B (collectively referred to as 133) may, for example, comprise a destination layer 2 address and destination layer 3 address respectively. Each field of the fields 131A, 131B, 133A and 133B may consist of a respective number of bits.

Using the layer 2 and/or layer 3 communication protocols, a portion of the header information contained in the fields 133 may effectively be used such that the data packet 120 can reach the second host 103 e.g. the other portion of the header information contained in fields 131 may not be mandatory as it may not be used for transmitting the data packet 120 to the second host 103. The fields 131 may be referred to as non-mandatory fields. The non-mandatory fields 131 may be part of a first portion of the header information of the data packet 120 and the fields 133 may be part of a second portion of the header information of the data packet 120.

The system 100 further comprises a database system 112. The database system 112 is configured to control access to data stored in a database 115 of the database system 112. The database system 112 may be denoted client location register (CLR). The gateways 105-107 may be configured to connect to the database system 112 e.g. using the internet 109.

While FIG. 1 shows two hosts and two gateways, it will be appreciated that numerous hosts and gateways may exist. Also, while FIG. 1 shows a few LANs, it will be appreciated that numerous LANs may exist.

FIG. 2 is a diagram illustrating a method for generating identity information of hosts e.g. 101-103 for enabling communication between hosts on different LANs.

The identity information 201 of a host 101 may be defined based on one or more non-mandatory fields of a data packet that can be transmitted by the host 101. The identity information 201 of the host 101 may comprise a value that uniquely identifies the host 101 while the host 101 is being served by the gateway 105. In one example, if the host 101 is removed from the system 100, the identity information of the host 101 may be assigned to a newly connected host to the system 100.

For example, if the host 101 is configured to communicate in accordance with the layer 2 communication protocol only, the non-mandatory field may be the field 131A as it may not be used for data submission from the host 101 to a peer host e.g. 103. In another example, if the host 101 is configured to communicate in accordance with the layer 2 and layer 3 communication protocols, the fields 131A and 131B may be non-mandatory fields for data submission from the host 101 to a peer host e.g. 103.

In the following, the determination or generation of the identity information may be described with reference to the non-mandatory field 131A having the layer 2 source address. The identity information may be determined as described with reference to field 131A using the non-mandatory fields 131A and 131B.

The field 131A consists of a set of N bits. A first grouping of N1 bits of the set of bits may be used to encode identity information of the host 101. The identity information of the host 101 may comprise a N1-bit binary value that uniquely identifies the host 101 while the host 101 being served by the gateway 105. As shown in FIG. 2, the N1-bit binary value for N1=24 may, for example, be expressed in hexadecimal digits that varies from 00:00:00 to FF:FF:FF.

A second grouping of N2 bits of the set of bits may be used for encoding identity information of the peer host 103. The second grouping of bits is distinct from the first grouping of bits. The identity information of the peer host 103 may be defined as described with reference to host 101.

In one example, the first grouping of bits may comprise half of bits of the field 131A and the second grouping of bits may comprise the other half of bits of the field 131A. In another example, the first and second grouping of bits may have different number of bits. This may enable to define the identity information of the host 101 depending on whether the host 101 is a receiver or a sender of a data packet. If, for example, the first grouping is 4 bytes long while the second grouping is 2 bytes long, this may indicate that e.g. 4 Billion source hosts can communicate with e.g. 65 thousand target hosts. This may allow to a-symmetrically extend address ranges. This may particularly be advantageous as there are many sensors in a factory that need to report their measurements to just a few servers.

All possible values of the first grouping of bits and second grouping of bits may, for example, be stored in a database 115. The database system 112 may, for example, be configured to control access to the stored values in the database 115. In another example, each of the gateways 105-107 may have access to the database 115.

Once the identity information 201 is assigned to the host 101, mapping information H1-set of the host 101 may be stored. The mapping information H1-set may comprise at least the identity information 201 of the host 101 in association with the information contained in the field 131A e.g. the identity information of the host 101 may be associated with a MAC address 205 of the host 101.

The mapping information of other hosts such as the host 103 may be determined as described with reference to the host 101. FIG. 2 shows mapping information H2-set of the host 103. The mapping information H2-set comprises the identity information of the host 103 in association with a MAC address 206 of the host 103. FIGS. 3A-3B provide an example for storing the mapping information H1-set and H2-set.

FIG. 3A is a diagram illustrating an example for storing the mapping information H1-set, H2-set of hosts 101-103 in a gateway e.g. 105 of the system 100.

The gateway 105 may comprise a local data container for storing the mapping information. The local data container may, for example, comprise lists 301 and 303. A first list 301 comprises mapping information for hosts served by the gateway 105 and a second list 303 comprises mapping information for peer hosts that are in communication with hosts served by the gateway 105. Storing locally the local data container may prevent querying remote databases, and thus may save processing resources.

Each of the lists 301-303 comprises an entry per host. An entry of the first list 301 comprises mapping information e.g. H1-set. For example, as shown in FIG. 3A, an entry of the first list 301 comprises a MAC address MAC-H1 of a host H1 and identity information mmH1 of host H1.

An entry of the second list 303 comprises mapping information e.g. H2-set in association with a layer 2 address of the gateway 107 that serves the peer host. For example, as shown in FIG. 3A, an entry of the second list 303 comprises a MAC address MAC-H2 of a host H2 and identity information mmH2 of host H2 in association with a MAC address MAC-AM2 of a gateway serving host H2.

For example, an entry of the second list 303 may be removed after a predefined time period. E.g. if, during the time period, no packets are sent or received to or from the host associated with the entry, the entry will be removed.

FIG. 3B is a diagram illustrating an example for storing the mapping information in the database system 112.

For example, once a host connects to a gateway 105, the gateway 105 may report a host MAC address of the host to the database system 112. If this host is unknown to the database system 112, the database system 112 may assign an identity information to the host e.g. using one of the possible values of the identity information stored in the database 115. Moreover, the database system 112 may store in a remote data container, such as a list 305, mapping information of the host. The mapping information may comprise a MAC address of the host and the assigned identity information (and IP address, if available). The mapping information may be associated in the list 305 with the MAC address of the gateway that serves the host. In addition to storing mapping information for hosts being currently connected to the system 100, the database system 112 may maintain mapping information of hosts that are previously connected to the system 100.

Storing remotely the mapping information may be advantageous, as in case a gateway 105-107 does not store locally the mapping information, the gateway may query the database system 112 as described with reference to FIGS. 4A and 4B.

Figure 4A:
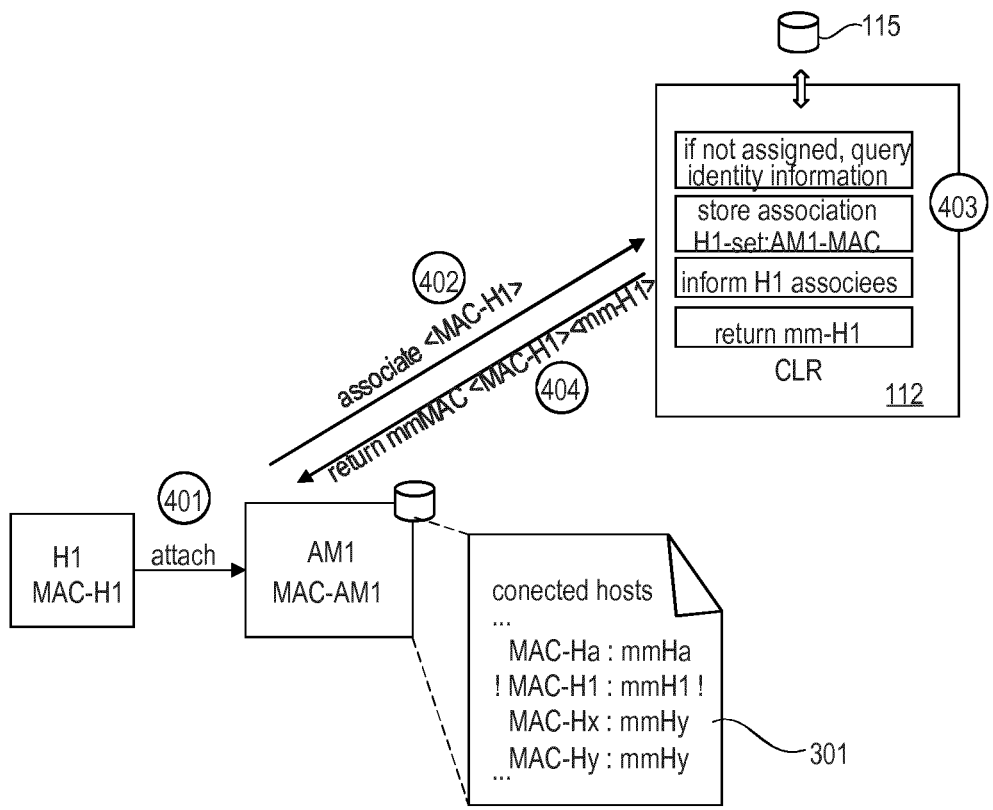
FIG. 4A is a diagram illustrating a method of determining the identity information of a host that newly connects to a gateway according to an example of the present subject matter.

FIG. 4A is a diagram illustrating a method of determining the identity information of a host that newly connects to a gateway 105.

Upon receiving (401) an attach request from a host 101 at the gateway 105, the gateway 105 may determine if the host 101 is associated with identity information in the first list 301. If the host 101 does not have a corresponding entry in the list 301, the gateway 105 may send an association message to the database system 112 (402). The message comprises a MAC address of the host 101. The message is indicative of a request of the identity information of the host 101. Upon receiving the message, the database system 112 may look up in the list 305, whether the host 101 has been assigned an identity information already, and, if not, the database system 112 may assign an identity information out of the database 115 to the host 101 and associate it with the MAC address of the gateway 105.

In one example, if the host 101 was previously assigned to another gateway, this other gateway may be informed by the database system 112 so that it can remove the mapping information of the host 101 out of its list 301. In another example, also other predefined gateways of (e.g. all gateways of) the system 100 may be informed so that they can remove the mapping information of the host 101 out of their respective list 301. The database system 112 may then return the identity information associated with the host 101 to the querying gateway (403). The gateway 105 may update (404) its list 301 by adding an entry for the host 101 comprising the received identity information and the MAC address of the host 101.

Figure 4B:
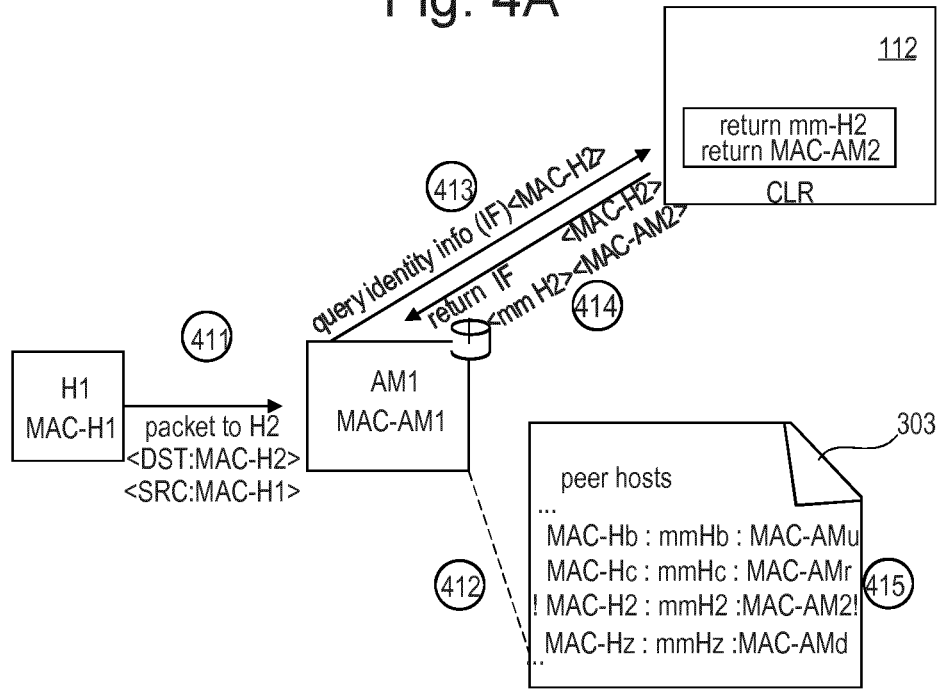
FIG. 4B is a diagram illustrating a method of determining the identity information of a peer host according to an example of the present subject matter.

FIG. 4B is a diagram illustrating a method of determining the identity information of a peer host 103 that is in communication with a host 101 severed by a gateway 105. The host 101 may send a packet to a peer host 103 (411) which is connected to gateway 107 but which has no associated entry in the second list 303 (412) (e.g. because there was no communication with that peer host since host 101 is attached). The gateway 105 may query the database system 112 for the identity information with a MAC address MAC-H2 of the peer host 103 (413). The database system 112 may look it up in its list 305 and return the MAC address MAC-AM2 of the gateway 107 that serves the peer host 103 and the identity information assigned to the peer host 103 (414). Finally, the gateway 105 may update (415) the second list 303 by adding an entry for the peer host 103.

In one example, the database system 112 may track previously received queries from different gateways and may inform those gateways if a host attaches to a new gateway to allow those gateways to update their list 303.

Figure 5:
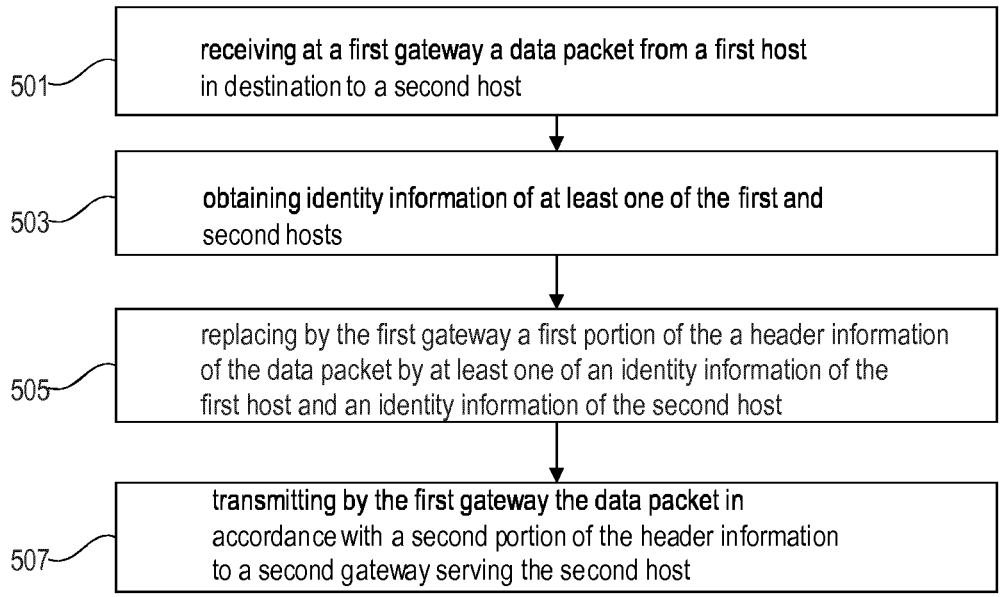
FIG. 5 is a flowchart of a method for transmitting a data packet according to an example of the present subject matter.

FIG. 5 is a flowchart of a method for transmitting a data packet according to an example of the present subject matter.

A first gateway may receive, in step 501, a data packet from a first host in destination to a second host. The second host may, for example, be served by a second gateway.

The first host may, for example, be configured to couple to the first gateway via a first network. The first network may, for example, be a first LAN. The second host may be configured to couple to the second gateway via a second network such as a second LAN. The first LAN and second LAN may, for example, be Ethernet networks. The communication between the first host and the first gateway may, for example, be performed in accordance with a layer 2 communication protocol. The communication between the second host and the second gateway may, for example, be performed in accordance with the layer 2 communication protocol.

Identity information of at least one of the first host and the second host may be obtained in step 503 using mapping information that is maintained locally by the first gateway. The mapping information of hosts, comprises for each of the hosts identity information of the host in association with a layer 2 address of the host. In one example, the mapping information of a host may be associated with a layer 2 address of a gateway that serves the host. For example, the received data packet may comprise the layer 2 address of the first host and a layer 2 address of the second host. The layer 2 address of the first host may be used by the first gateway to identify the identity information of the first host in the mapping information. If an identity information of the first host is not found in the local mapping information, the first gateway may request that identity information from a remote database system that maintains mapping information. The database system may return the identity information if it is present in its mapping information, otherwise, the database system may generate the identity information and may send it to the first gateway.

The first gateway may further determine the identity information of the second host and/or the layer 2 address of the second gateway using the layer 2 address of the second host that is in the received data packet. For that, the first gateway may use the local mapping information or the remote mapping information. E.g. the layer 2 address of the second host may be used by the first gateway to identify the identity information of the second host and/or the layer 2 address of the second gateway in the mapping information of the first gateway. If an identity information of the second host and/or layer 2 address of the second gateway is not found in the local mapping information, the first gateway may request that identity information and/or layer 2 address from the remote database system using the layer 2 address of the second host. The database system may return or send to the first gateway the layer 2 address of the second gateway and the identity information of the second host.

The first gateway may replace (swap), in step 505, a first portion of a header (or of a header information) of the received data packet by information comprising the identity information of at least one of the first host and the second host. In one example, the information may comprise the identity information of the second host. In another example, the information may further comprise the identity information of the first host. In one example, the first gateway may further replace the network destination address of the second portion of the data packet by the network address of the second gateway.

Each of the first and second gateways may be configured to enable data transmission from one network to another network. For example, the first gateway may be configured to enable data flow or data transmission from the first LAN to the second LAN e.g. in accordance with a tunneling communication protocol. The second gateway may be configured to enable data flow or data transmission from the second LAN to the first LAN e.g. in accordance with the tunneling communication protocol.

The identity information that is used to replace the first portion, in association with at least part of the header information is accessible by the first gateway and second gateway. For example, the identity information of the first host in association with the source layer 2 address of the header information may be accessible by the first and second gateways. The identity information of the second host in association with the destination layer 2 address of the header information may be accessible by the first and second gateways.

The first gateway may transmit, in step 507, the modified data packet that results from step 503 in accordance with a second portion of the header information to the second gateway. The second portion of the header information may indicate destination addresses. For example, the transmission may be performed in accordance with the tunneling communication protocol. Since the second gateway has access to the association between the identity information and the layer 2 address of the first and second hosts, the second gateway may use the accessible information in order to transmit the data packet to the second host. For example, the second gateway may determine or identify, using that information, the layer 2 address of the second host using the identity information of the second host of the received data packet at the second gateway. The second gateway replaces the network destination address that is in the received data packet by the identified network address of the second host before transmitting the data packet to the second host. The second gateway may, for example, further replace the identity information of the first and second hosts by a layer 2 source address of the first host before transmitting the data packet to the second host.

Figure 6:
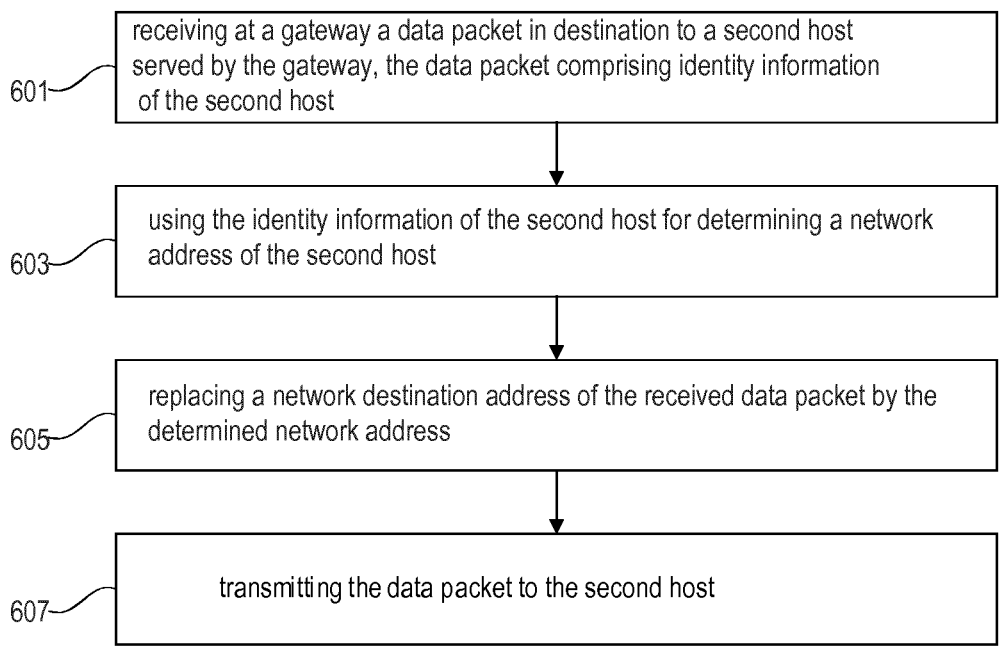
FIG. 6 is a flowchart of a method for transmitting a data packet according to an example of the present subject matter.

FIG. 6 is a flowchart of a method for transmitting a data packet in accordance with an example of the present subject matter.

A second gateway may receive in step 601 a data packet in destination to a second host served by the second gateway. For example, the data packet sent by the first gateway in step 505 may be the received data packet. The data packet comprises an identity information of the second host.

The second gateway may use in step 603 the identity information of the second host for determining a network address of the second host.

The second gateway may replace in step 605 a network destination address of the received data packet by the determined network address. In step 607, the second gateway 107 may transmit the data packet that results from step 605 to the second host.

Figure 7:
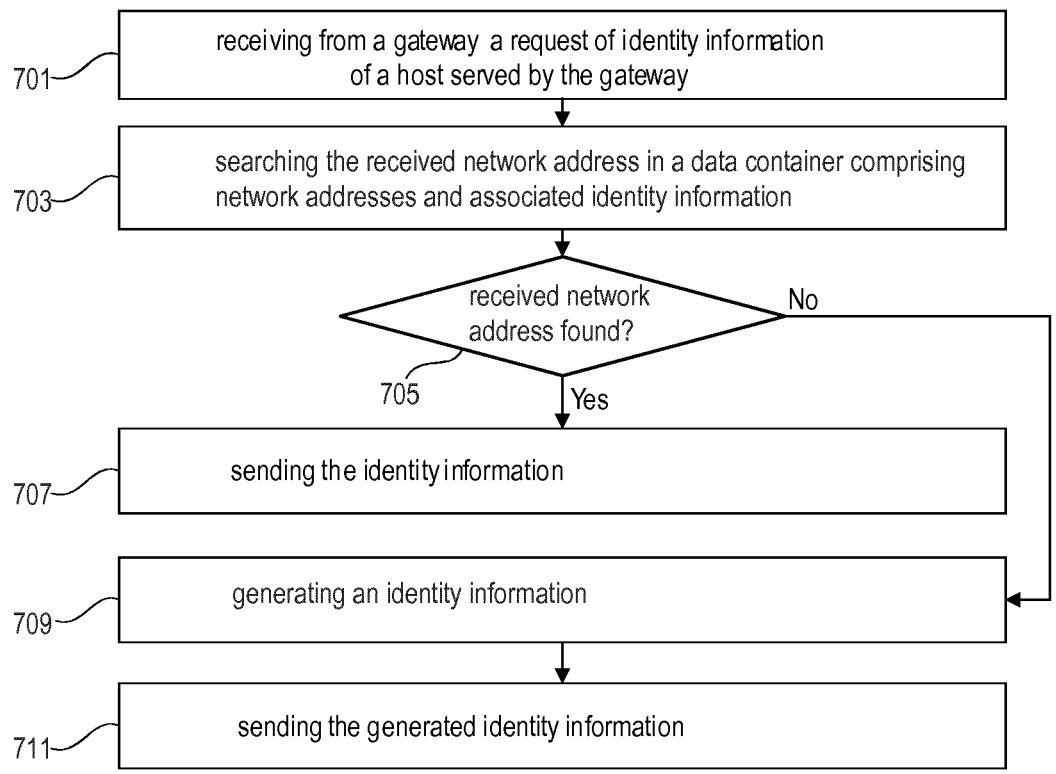
FIG. 7 is a flowchart of a method for providing identity information according to an example of the present subject matter.

FIG. 7 is a flowchart of a method for providing identity information in accordance with an example of the present subject matter.

A data base system may receive, in step 701, from a gateway a request of identity information of a host served by the gateway. The request indicates a network address of the host.

The data base system may search, in step 703, the received network address in a data container comprising network addresses and associated identity information. In response to identifying (inquiry step 705) the received network address in the data container, the data base system may return or send, in step 707, an identity information associated with the identified network address to the gateway. Otherwise (inquiry step 705) the database system may generate an identity information in step 709 and may return or send in step 711 the generated identity information to the gateway.

The network address may, for example, comprise a layer 2 address or a layer 3 address.

Figure 8A:
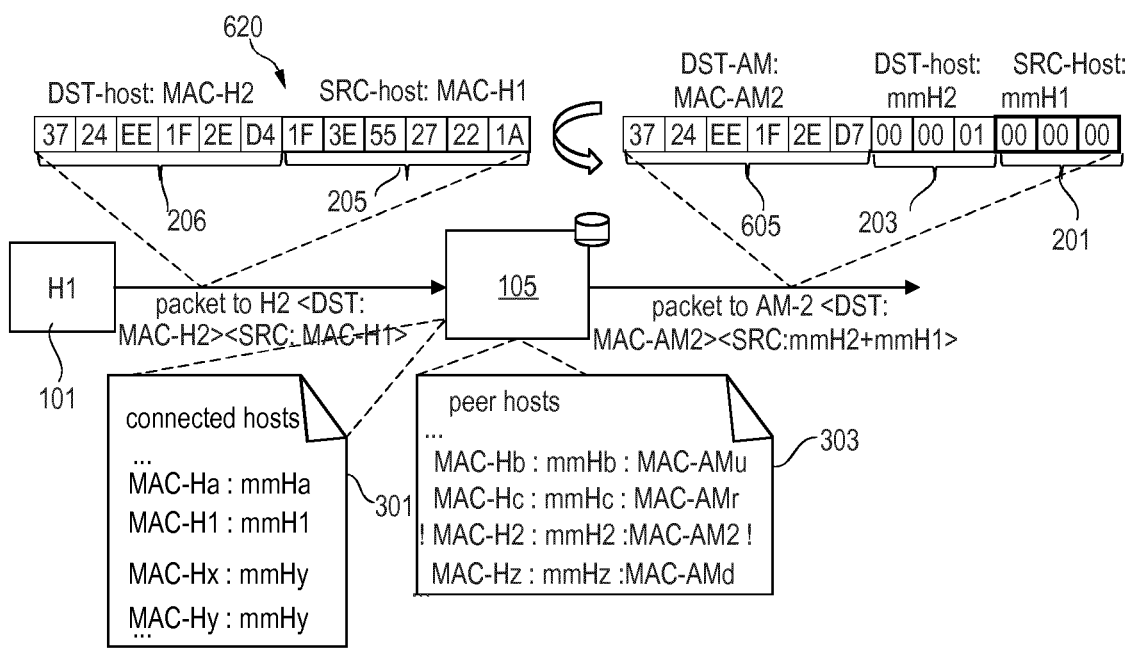
FIG. 8A is a diagram illustrating a method at a gateway according to an example of the present subject matter.
Figure 8B:
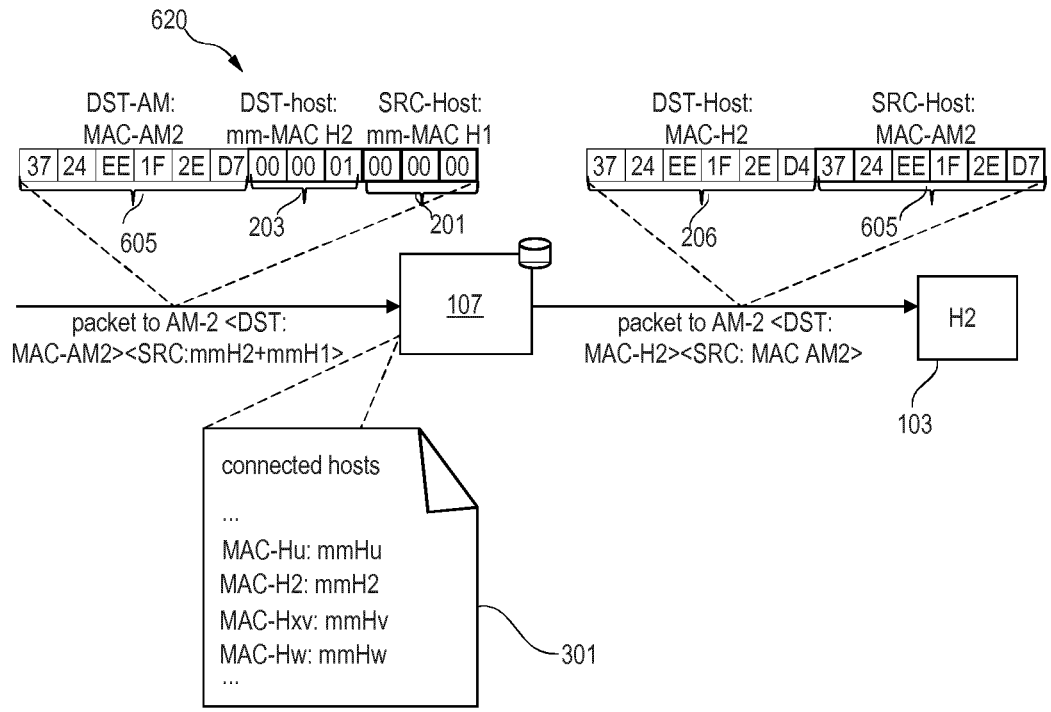
FIG. 8B is a diagram illustrating a method at a gateway according to an example of the present subject matter.
Figure 8C:
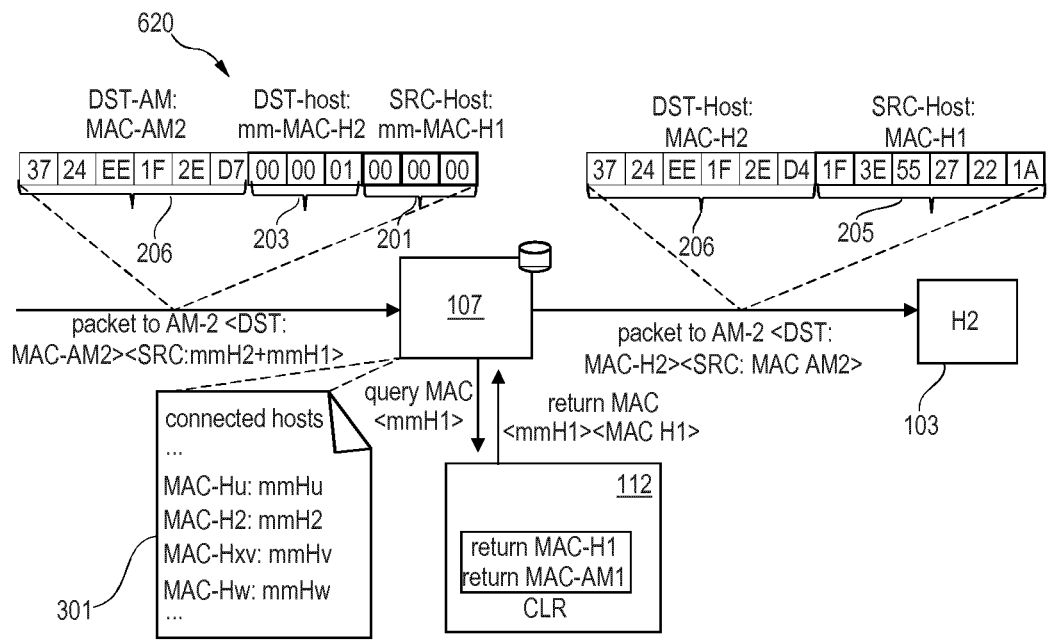
FIG. 8C is a diagram illustrating a method at a gateway according to an example of the present subject matter.

FIGS. 8A-8C are diagrams illustrating a method for transmitting a data packet from a first host 101 to a second host 103 in accordance the layer 2 communication protocol. For the purpose of explanation, the method described in FIGS. 8A-8C may be implemented in the system illustrated in FIG. 1, but is not limited to this implementation.

FIG. 8A is a diagram illustrating a method at a first gateway 105 that serves the first host 101. If the first host 101 sends a data packet 620 to a second host 103, the data packet 620 includes a MAC address of the second host 103 as destination MAC address 633 and its own MAC address as source MAC address 631. The first gateway 105 that serves the host 101 may receive the data packet 620.

The destination MAC address 206 may be replaced by the MAC address 605 of the gateway 107 that serves the second host 103. The source MAC address 205 may be replaced by a combination of the identity information 203 of the second host 103 and the identity information 201 of the first host 101. Each of the identity information of 201 and 203 may be 3 bytes long. Since both are 3 bytes long, they match into the field of the source MAC address 205.

The modified packet 620 may be conveyed further on to the network with the second gateway 107 as destination.

FIG. 8B is a diagram illustrating a method for processing a data packet 620 at a second gateway 107 that serves the second host 103.

Upon receiving the packet 620, the second gateway 107 may replace the destination MAC address 605 with the MAC address 206 of the second host. The MAC address 206 of the second host 103 may be obtained or resolved by looking up in the list 301 of the second gateway 107 for the entry that corresponds to the identity information 203 of the second host. The identity information of the first and second hosts may be replaced by the MAC address 605 of the second gateway 107 comprised in the searched entry.

FIG. 8C is a diagram illustrating another method for processing a data packet 620 at a second gateway 107 that serves the second host 103.

Upon receiving the packet 620, the second gateway 107 may replace the destination MAC address 605 with the MAC address 206 of the second host. The MAC address 206 of the second host 103 may be obtained or resolved by looking up in the list 301 of the second gateway 107 for the entry that corresponds to the identity information 203 of the second host. The second gateway 107 may search for mapping information in its list 303 associated with the identity information of the first host 101. If it's not found, the second gateway may query the database system 112 to obtain the MAC address of the first host 101 referenced by its identification information 201. Once the MAC address 205 for the first host 101 is received, the list 303 of the second gateway 107 may be updated accordingly and the identity information 201-203 may be replaced by the MAC address 205 of the first host 101.

Figure 9:
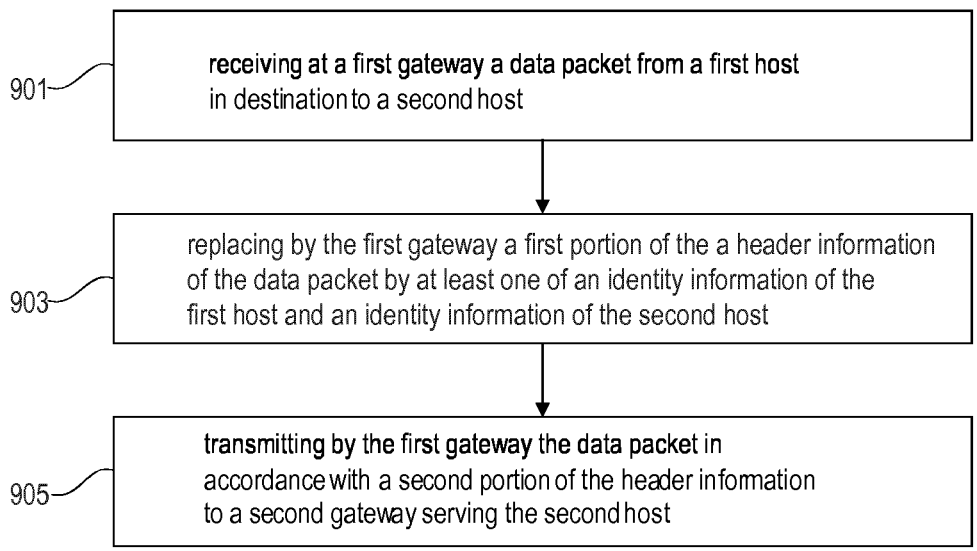
FIG. 9 is a flowchart of a method for transmitting a data packet according to an example of the present subject matter.

FIG. 9 is a flowchart of a method for transmitting a data packet in accordance with an example of the present subject matter.

A first gateway may receive, in step 901, a data packet from a first host in destination to a second host. The second host may, for example, be served by a second gateway.

The first gateway may replace, in step 903, a first portion of a header of the received data packet by information comprising an identity information of at least one of the first host and the second host.

The first gateway may transmit, in step 905, the data packet that results from step 503 in accordance with a second portion of the header information to the second gateway.

Figure 10:
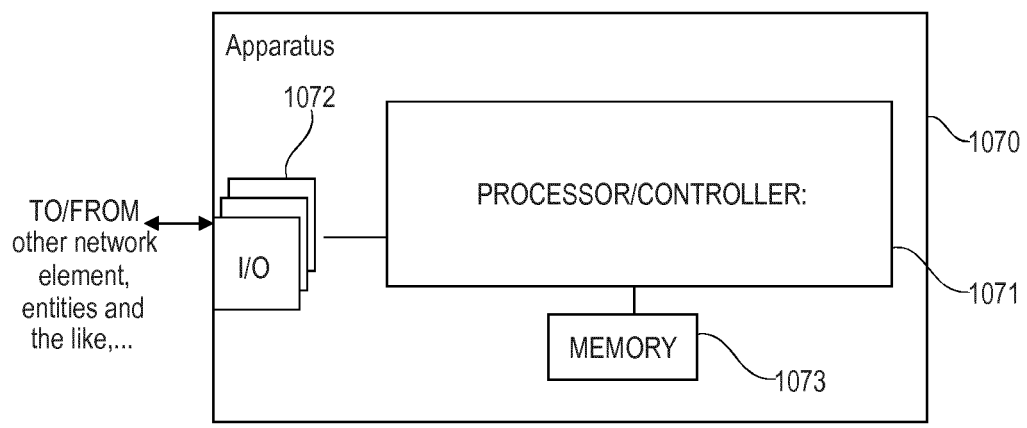
FIG. 10 is a block diagram showing an example of an apparatus according to example of the present subject matter.

FIG. 10 is a block diagram showing an example of an apparatus according to example of the present subject matter.

In FIG. 10, a block circuit diagram illustrating a configuration of an apparatus 1070 is shown, which is configured to implement at least part of the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus, or the like. The apparatus 1070 may comprise a processing function or processor 1071, such as a CPU or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be implemented in or may be part of a gateway or the like, and may be configured to perform a method as described in connection with FIG. 5, 6 or 9.

The processor 1071 is configured to perform receiving a data packet from a first host in destination to a second host, replacing by the first gateway a first portion of a header information of the data packet by information comprising an identity information of at least one of the first host and the second host, transmitting by the first gateway the data packet in accordance with a second portion of the header information to a second gateway serving the second host.

According to a further example, the processor 1071 is further configured to perform, receiving a data packet in destination to a second host served by the gateway, wherein the data packet comprises an identity information of the second host, using the identity information of the second host for determining a network address of the second host, replacing a network destination address of the received data packet by the determined network address and transmitting the data packet to the second host.

According to further example, the apparatus 1070 may be implemented in or may be part of a database system, and the processor 1071 is further configured to perform receiving from a request of identity information of a host served by the gateway, the request being indicative of a network address of the host, searching the received network address in a data container of network addresses to identity information, in response to identifying the received network address in the data container, returning an identity information associated with the identified network address, otherwise generating an identity information, and returning the generated identity information.

The invention claimed is:

1. A method, comprising:
receiving by a first gateway a data packet from a first host, wherein the data packet is destined for a second host, the data packet comprising a MAC address of the second host as a destination MAC address and a MAC address of the first host as a source MAC address;
replacing by the first gateway the destination MAC address with a MAC address of a second gateway serving the second host and the source MAC address by a combination of a shortened identifier of the first host and a shortened identifier of the second host; and
transmitting by the first gateway the data packet in accordance with the destination MAC address of the second gateway serving the second host.

2. The method of claim 1, the data packet further comprising user defined information.

3. The method of claim 1, further comprising determining the identifiers of the first and second hosts using the source MAC address.

4. The method of claim 1, wherein the identifier of the first host is a value of a first grouping of bits and the identifier of the second host is a value of a second grouping of bits, wherein the first and second grouping of bits have the same number of bits.

5. The method of claim 1, wherein the identifier of the first host is a value of a first grouping of bits, the method further comprising determining the first grouping of bits such that the maximum number of possible values of the first grouping of bits is smaller than or equal to a predefined maximum number of hosts that can be served by the first gateway, wherein the identifier of the second host is a value of a second grouping of bits, the method further comprising determining the second grouping of bits such that the maximum number of possible values of the second grouping of bits is smaller than or equal to a predefined maximum number of hosts that can be served by the second gateway.

6. The method of claim 1, the first gateway comprising a local data container comprising MAC addresses and associated identifiers, the method further comprising determining the identifier of the first host or second host using the local data container.

7. The method of claim 1, the method further comprising upon receiving the data packet, querying a remote data container comprising MAC addresses and associated identifiers with the MAC address of the first host or second host and receiving the identifiers from a database system storing the remote data container.

8. The method of claim 1, further comprising using by the second gateway the identifier of the first host or the second host for forwarding the data packet to the second host in accordance with a layer 2 communication protocol.

9. The method of claim 1, further comprising: receiving at the first gateway another data packet from another first host destined for to another second host; in response to determining that the first host is detached from the first gateway repeating the method using the identifier of the first host as an identifier of the other first host.

10. A non-transitory computer-readable medium encoded with a computer program comprising instructions for performing at least the following:
receiving by a first gateway a data packet from a first host, wherein the data packet is destined for a second host, the data packet comprising a MAC address of the second host as a destination MAC address and a MAC address of the first host as a source MAC address;
replacing by the first gateway the destination MAC address with a MAC address of a second gateway serving the second host and the source MAC address by a combination of a shortened identifier of the first host and a shortened identifier of the second host;
transmitting by the first gateway the data packet in accordance with the destination MAC address of the second gateway serving the second host.

11. An apparatus, comprising:
at least one processor; and
at least one memory including computer program code, said at least one memory and computer program code being configured, with the at least one processor, to cause the apparatus to:
receive a data packet from a first host, wherein the data packet is destined for a second host, the data packet comprising a MAC address of the second host as a destination MAC address and a MAC address of the first host as a source MAC address;

replace the destination MAC address with a MAC address of a second gateway serving the second host and the source MAC address by a combination of a shortened identifier of the first host and a shortened identifier of the second host; and transmit the data packet in accordance with the destination MAC address of the second gateway serving the second host.

12. A method, comprising:

receiving at a gateway a data packet from another gateway serving a first host, wherein the data packet is destined for a second host served by the gateway, the data packet comprising as a destination MAC address a MAC address of the gateway, and comprising a combination of a shortened identifier of the first host and a shortened identifier of the second host;

using the identifier of the second host for determining a MAC address of the second host;

replacing the destination MAC address of the received data packet by the MAC address of the second host and the combined shortened identifiers of the first and second hosts of the received data packet by the MAC address of the gateway; and transmitting the data packet to the second host.

13. A non-transitory computer-readable medium encoded with a computer program comprising instructions for performing at least the following:

receiving at a gateway a data packet from another gateway serving a first host, wherein the data packet is destined for a second host served by the gateway, the data packet comprising as a destination MAC address a MAC address of the gateway and comprising a combination of a shortened identifier of the first host and a shortened identifier of the second host;

using the identifier of the second host for determining a MAC address of the second host;

replacing the destination MAC address of the received data packet by the MAC address of the second host and the combined shortened identifiers of the first and second hosts of the received data packet by the MAC address of the gateway;

transmitting the data packet to the second host.

14. An apparatus, comprising:

at least one processor; and at least one memory including computer program code, said at least one memory and computer program code being configured, with the at least one processor, to cause the apparatus to:

receive a data packet from a gateway serving a first host, wherein the data packet is destined for a second host served by the gateway, the data packet comprising as a destination MAC address a MAC address of the gateway and comprising a combination of a shortened identifier of the first host and a shortened identifier of the second host;

use the identifier of the second host for determining a MAC address of the second host;

replace the destination MAC address of the received data packet by the MAC address of the second host and the combined shortened identifiers of the first and second hosts of the received data packet by the MAC address of the gateway; and transmitting the data packet to the second host.

* * * * *